Sept. 16, 1930.                    H. I. McGUIRE                    1,775,773
                          SWITCH FOR COOLING WATER ALARMS
                                Filed March 19, 1927
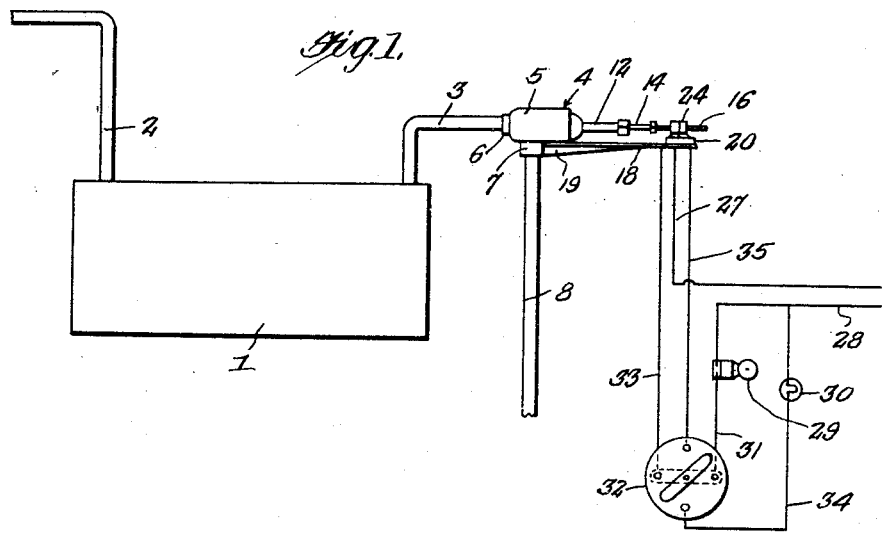
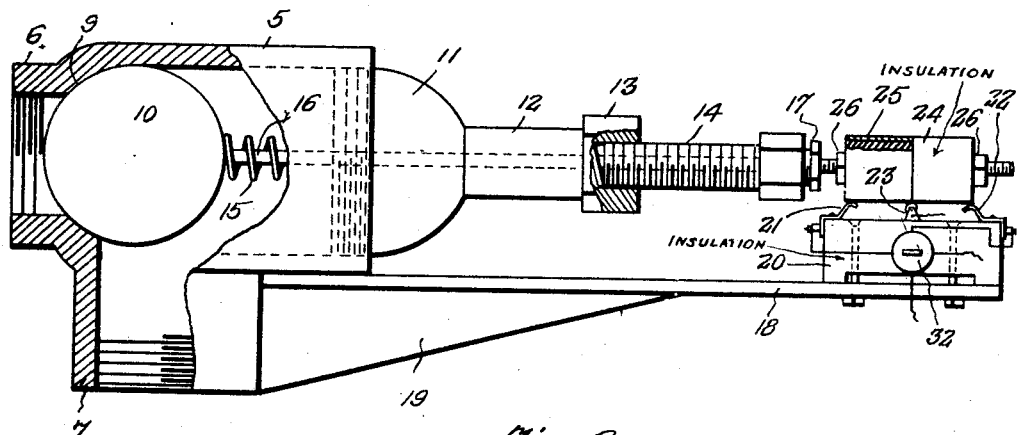
Inventor
H. I. McGuire,
By Clarence A. O'Brien
Attorney Patented Sept. 16, 1930

1,775,773

UNITED STATES PATENT OFFICE

HAROLD I. McGUIRE, OF KIRKLAND LAKE, ONTARIO, CANADA

SWITCH FOR COOLING-WATER ALARMS

Application filed March 19, 1927. Serial No. 176,755.

This invention relates to a device for indicating the circulation of cooling water or other fluid, in various types of machines requiring a continuous liquid circulation for their efficient operation.

The invention is more particularly designed for use in machines requiring a liquid cooling medium, which must be continually circulated through the machine to provide an alarm for indicating when the cooling medium is in circulation, and when the circulation fails.

The invention comprehends the provision of a special control unit for association with the fluid circulating conduits of the machine, adapted for operation by the fluid, to produce electric control suitable visual and audible signals of a character to immediately indicate to the operator of the machine, the condition of the circulating cooling fluid.

The invention comprehends numerous other objects residing in the specific details of construction and arrangement of the parts for association with the machine, which are more particularly pointed out in the following detailed description and claim, directed to the preferred form of the invention, it being understood, however, that various changes in the size, shape and arrangement of parts may be made without departing from the spirit or scope of the invention as herein set forth.

In the drawings, forming a part of this application:

Figure 1 is a diagrammatic illustration of a machine having fluid circulating pipes attached thereto, with the improved alarm associated with the machine in operative relation, showing diagrammtically the circuit connection for the visual and audible signals.

Figure 2 is an enlarged side elevation, partly in section of the control unit for the signal.

1 indicates diagrammatically any machine requiring a circulation of fluid, for cooling or otherwise, during its continuous efficient operation, which may have an inlet for the fluid through a suitable conduit 2, and an outlet through the pipe 3.

The control unit forming part of the subject matter of this invention is indicated generally at 4, in Figure 1, and in the detail in Figure 2, and includes a hollow body 5, provided with an internally threaded sleeve projection 6, for receiving the discharge pipe 3, forming an inlet to the fitting, and at the side with an internally threaded sleeve extension 7 forming an outlet fitting for receiving the discharge pipe 8. The body 5 is provided with a valve seat, at 9, with which the ball valve 10 is adapted to engage. The opposite end of the body is threaded internally to threadedly receive a cap member 11, of substantial dome shape, having a sleeve extension 12 provided with the hexagonal head 13 on the free end thereof. This sleeve is threaded internally to receive the plug 14, adapted for adjustment in the sleeve extension 12 to vary the tension of the spring 15, positioned between the ball valve 10 and the inner end of the plug, and normally tending to seat said valve. This coil spring encircles the operating rod 16 secured at one end to the ball valve 10, and slidably extending through a bore formed in the plug 14, the opposite end extending substantially beyond the end of the plug 14, and having a suitable packing applied to the outer end of the plug and retained by the packing nut 17 to prevent leakage of the fluid from the body.

The extension 7 from the side of the body is provided with a plate extension 18 secured at one end and suitably supported in rigid extension thereon by the web 19, the outer end of which extends under and beyond the end of the plug 14, for supporting a suitable stationary contact block 20, formed of suitable insulating material. This block is bolted to the end of the plate member 18 and the upper face terminates below the free end of the operating rod 16 and is provided on the opposite ends under said rod with resilient contact members 21 and 22, and in the central portion with a resiliently projected roller 23, carried in a suitable bracket mounted in the block member 20, the roller being projected upwardly above said body.

The free end of the operating rod 16 above the block member 20 is threaded and mounts a suitable body of insulating material 24 carrying the contact sleeve 25, on one end portion thereof. Suitable lock nuts 26 are threadedly mounted on the operating rod 16, for retaining the body 24, in the desired position of adjustment on the rod.

The central or roller contact 23, as shown in Figure 1 is suitably and electrically connected with one side of a circuit from a suitable source of power, by wire 27.

The other side of the circuit from the source of power is connected through the wire 28, with one terminal of a bell 29 and a lamp 30. The opposite terminal of the bell is connected by the wire 31 to one terminal of a two way switch 32, adapted for suitable operation to close the circuit from the wire 31, to the wire 33, which is connected to the contact 21, on body 20. In the second position of the two way switch 32 it is adapted to close the circuit with the wire 34, from the other terminal of the lamp 30, and the wire 35 connected with contact 22.

The body 24 is so adjusted on the operating rod 16 that when the ball valve 10 is in seated position as shown in Figure 2 of the drawing, the contact sleeve 25 thereon, will engage the roller contact and the contact 21 to close the circuit to the bell 29, giving audible signal indicating the lack of flow of fluid through the body 5. As soon as a flow of fluid is maintained through the discharge pipes 3 and 8 and the body 5, the ball valve 10 will be maintained in unseated relation due to the fluid forcing the same open against the tension of the spring 15, which will move the operating rod 16 and the body 24, so that in the normal open position of the valve 10, as maintained by the proper flow of liquid through the pipes 3 and 8, the sleeve 25 will bridge contacts 23 and 22, thereby closing the circuit for the lamp 30, to indicate the proper operation of the machine, with fluid flow therethrough. The two-way switch 32 controls the operation of the signal in such a manner that it must be positioned during the normal operation of the fluid flow through the machine, so as to extinguish the light 30 and place the circuit through the bell 29 in closed relation through the switch, for immediately energizing and operating the bell signal, in the event that fluid flow stops. In such a case, the operator of the machine is then obliged to operate the switch to the other position, closing the circuit to the switch 32 with the light 30, so that he may ascertain when the proper flow has been reached in the machine, to maintain it in efficient operating condition. However, regardless of the position of the switch, as indication is always made that the liquid has either stopped flowing or that it is being maintained at a normal flow required by the efficient operation of the machine.

It will thus be apparent that a highly novel and efficient alarm mechanism has been provided, in combination with a machine requiring cooling fluids, which will efficiently operate to signal the maintenance of proper circulation of fluid or the lack of circulation thereof.

Having thus described my invention, what I claim as new is:

A circuit closer for pressure operated fluid control valves of fluid circulation systems comprising a stationary contact support having a contact roller mounted thereon, said roller forming one connection with an electric circuit, a pair of stationary contact members carried by said support and disposed oppositely with respect to the roller in spaced relation therefrom and cooperating with said roller to provide a selective circuit closing connection and a movable contact member slidably supported on said roller in constant circuit closing engagement therewith, and operatively connected with the flow control valve for movement into circuit closing position with either of said spaced contact members upon a predetermined movement of said valve.

In testimony whereof I affix my signature.

HAROLD I. McGUIRE.